US009005065B2

(12) United States Patent
Huang et al.

(10) Patent No.: US 9,005,065 B2
(45) Date of Patent: Apr. 14, 2015

(54) TWO-STAGE DIFFERENTIAL CYCLOIDAL SPEED REDUCER WITH A HIGH REDUCTION RATIO

(71) Applicant: Industrial Technology Research Institute, Chutung Township, Hsinchu County (TW)

(72) Inventors: Chun-Hung Huang, Hsinchu (TW); Chang-Chia Hsieh, Hsinchu (TW); Jyh-Jone Lee, Hsinchu (TW); Cho-Chun Chiu, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 0 days.

(21) Appl. No.: 13/860,089

(22) Filed: Apr. 10, 2013

(65) Prior Publication Data

US 2014/0018203 A1   Jan. 16, 2014

(30) Foreign Application Priority Data

Jul. 13, 2012 (TW) .............................. 101125261 A (51) Int. Cl.
*F16H 1/32* (2006.01)
(52) U.S. Cl.
CPC ............ *F16H 1/32* (2013.01); *F16H 2001/323* (2013.01)
(58) Field of Classification Search
USPC ........... 475/13, 162, 165, 166, 169, 170, 178, 475/179, 181
See application file for complete search history.

(56) References Cited

U.S. PATENT DOCUMENTS

| 4,537,094 | A | * | 8/1985 | Bursa et al. | ................... | 475/168 |
| 4,643,047 | A | * | 2/1987 | Distin et al. | .................. | 475/168 |
| 5,188,572 | A | * | 2/1993 | Yamaguchi et al. | .......... | 475/168 |
| 6,508,737 | B2 | | 1/2003 | Fujimoto | | |
| 2010/0048342 | A1 | | 2/2010 | Chadwick | | |
| 2013/0203544 | A1 | * | 8/2013 | Kobayashi et al. | ........... | 475/169 |

FOREIGN PATENT DOCUMENTS

| CN | 2856587 Y | 1/2007 |
| TW | I257460 | 7/2006 |

OTHER PUBLICATIONS

Blagojevic, Mirko et al., A New Design of a Two-Stage Cycloidal Speed Reducer, Journal of Mechanical Design, 2011, pp. 1-7.

(Continued)

*Primary Examiner* — Justin Holmes
*Assistant Examiner* — Timothy Hannon
(74) *Attorney, Agent, or Firm* — Muncy, Geissler, Olds & Lowe, P.C.

(57) ABSTRACT

A two-stage differential cycloidal speed reducer with a high reduction ratio is provided, including: a plurality of supporting crank shafts; an input shaft including a first crank shaft portion and a second crank shaft portion; a first cycloidal gear provided on the first crank shaft portion; a second cycloidal gear provided on the second crank shaft portion and connected with the first cycloidal gear through the supporting crank shafts; a plurality of first ring pins provided around the outer circumference of the first cycloidal gear and in sliding contact with a plurality of teeth on the periphery of the first cycloidal gear; a first annular gear with the plurality of first ring pins; a plurality of second ring pins provided around the outer circumference of the second cycloidal gear and being in sliding contact with a plurality of teeth on the periphery of the second cycloidal gear; and a second annular gear with the plurality of second ring pins.

14 Claims, 5 Drawing Sheets

(56) References Cited

OTHER PUBLICATIONS

Yan, Hong-Sen et al., Geometry design of an elementary planetary gear train with cylindrical tooth-profiles, Mechanism and Machine Theory, 2002, pp. 757-767.

Li, Xin et al., A New Cycloid Drive With High-Load Capacity and High Efficiency, Journal of Mechanical Design, 2004, pp. 683-686.

Sensinger, Jonathon W., Unified Approach to Cycloid Drive Profile, Stress, and Efficiency Optimization, Journal of Mechanical Design, 2010, pp. 1-5.

Gorla, Carlo et al., Theoretical and Experimental Analysis of a Cycloidal Speed Reducer, Journal of Mechanical Design, 2008, pp. 1-8.

Yang, D.C.H. et al., Design and Application Guidelines for Cycloid Drives with Machining Tolerances, Mechanism and Machine Theory, 1990, pp. 487-501.

\* cited by examiner

TWO-STAGE DIFFERENTIAL CYCLOIDAL SPEED REDUCER WITH A HIGH REDUCTION RATIO

CROSS-REFERENCE TO RELATED APPLICATIONS

This application claimed priority to Taiwanese Patent Application No. 101125261, filed on Jul. 13, 2012. The entirety of the above-mentioned patent application is hereby incorporated by reference herein and made a part of this specification.

TECHNICAL FIELD

The present disclosure relates to speed reducers, and, more particularly, to a two-stage differential cycloidal speed reducer with a high reduction ratio.

BACKGROUND

A speed reducer is a power transmission device that reduces the number of spins of a motor to a desired number of spins to obtain a higher torque by using gears. In conventional power and motion transmission devices, the speed reducer is widely used in various fields, such as ships, automobiles, heavy machinery used in construction, processing machines and automated manufacturing apparatus used in machinery industry, common home appliances, watches. The speed reducer can be applied from the large power transmission to the transmission of small load and precise angle.

Speed reducers currently used in robots are mainly gear speed reducers, harmonic speed reducers (harmonic drive), RV speed reducers and cycloid speed reducers. A harmonic drive has the advantages of a large transmission ratio, smooth operation, simple structure, and high transmission efficiency, and is an ideal gearing. However, the harmonic drive transmits load and motion through the elastic deformation of its flexible disc, so it is difficult to raise the rigidity, and the motion accuracy will be significantly reduced with time. The price of the harmonic drive is also too high.

As for the structures of the robots, a lot of rod movements are necessary, so the rod sizes and weights will affect its inertia and load capacity. If a compact speed reducer is employed, inertia can be reduced. In view of a lack of rigidity in harmonic drive and the size of apparent structure as well as the weight of the RV speed reducers, a small speed reducer with high reduction ratio is in earnest needs.

SUMMARY

The present disclosure provides a cycloidal speed reducer with a differential two-stage high reduction ratio, which includes; a plurality of supporting crank shafts; an input shaft including a first crank shaft portion and a second crank shaft portion, the first crank shaft portion and the second crank shaft portion bending in the opposite direct on from the axis of the input shaft as the center; a first cycloidal gear provided on the first crank shaft portion of the input shaft and having a plurality of teeth on the periphery thereof; a first annular gear provided on one end of the input shaft adjacent the first cycloidal gear and having a plurality of first ring pins provided around the outer circumference of the first cycloidal gear and being in sliding contact with the plurality of teeth of the first cycloidal gear; a second cycloidal gear provided on the second crank shaft portion of the input shaft and connected with the first cycloidal gear through the plurality of supporting crank shafts, and having a plurality of teeth on the periphery thereof; and a second annular gear provided on one end of the input shaft adjacent the second cycloidal gear and having a plurality of second ring pins provided around the outer circumference of the second cycloidal gear and being in sliding contact with the plurality of teeth of the second cycloidal gear.

BRIEF DESCRIPTION OF THE DRAWINGS

The present disclosure can be more fully understood by reading the following detailed description of the preferred embodiments, with reference made to the accompanying drawings, wherein.

DETAILED DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
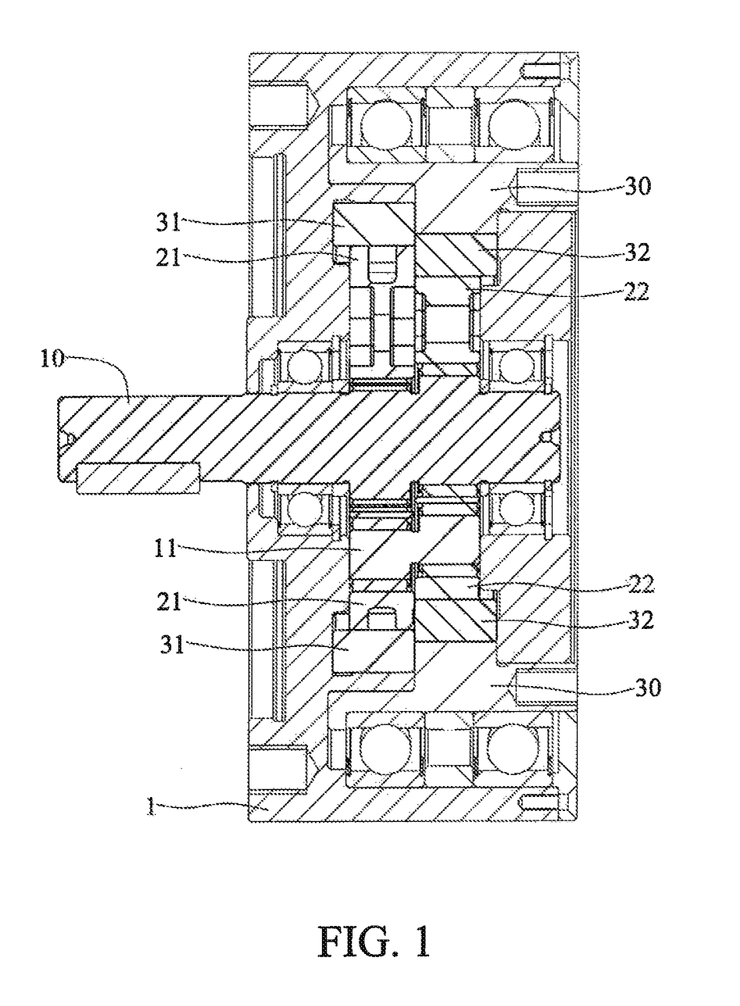
FIG. 1 is a cross-sectional diagram illustrating a two-stage differential cycloidal speed reducer with a high reduction ratio in accordance with the present disclosure.
Figure 2A:
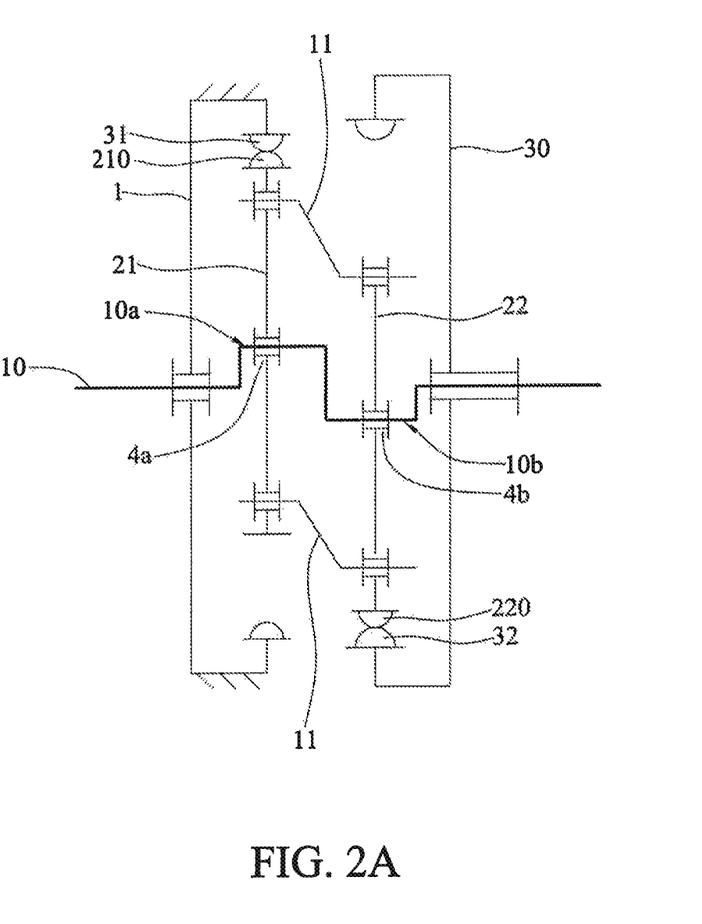
FIG. 2A is a schematic diagram depicting the two-stage differential cycloidal speed reducer with a high reduction ratio of an embodiment in accordance with the present disclosure.
Figure 2B:
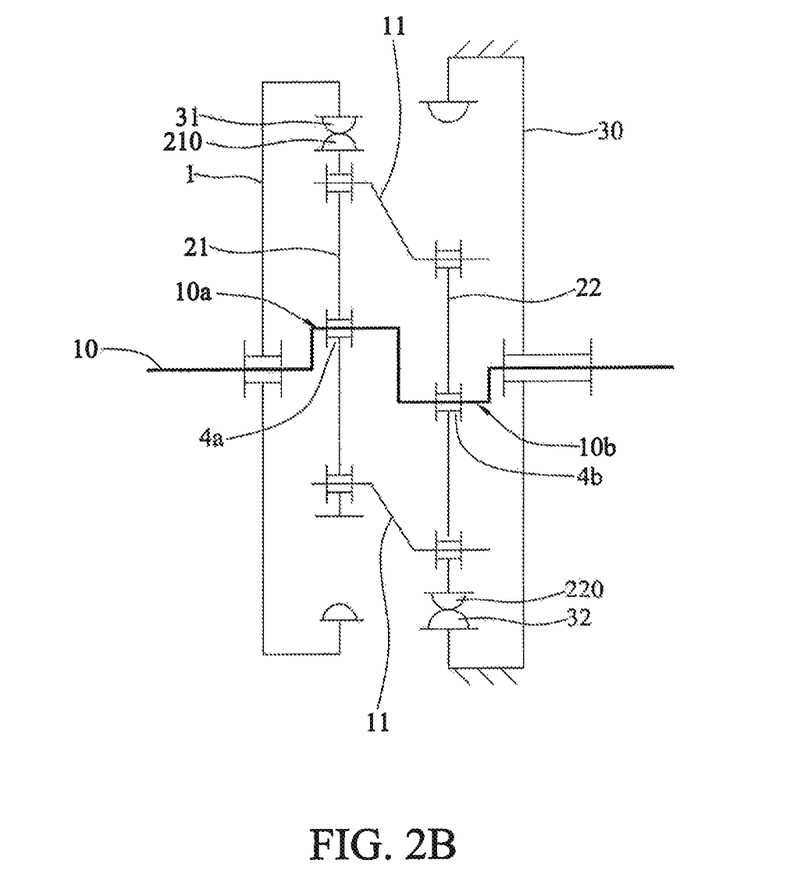
FIG. 2B is a schematic diagram depicting the two-stage differential cycloidal speed reducer with a high reduction ratio of an another embodiment in accordance with the present disclosure.
Figure 3:
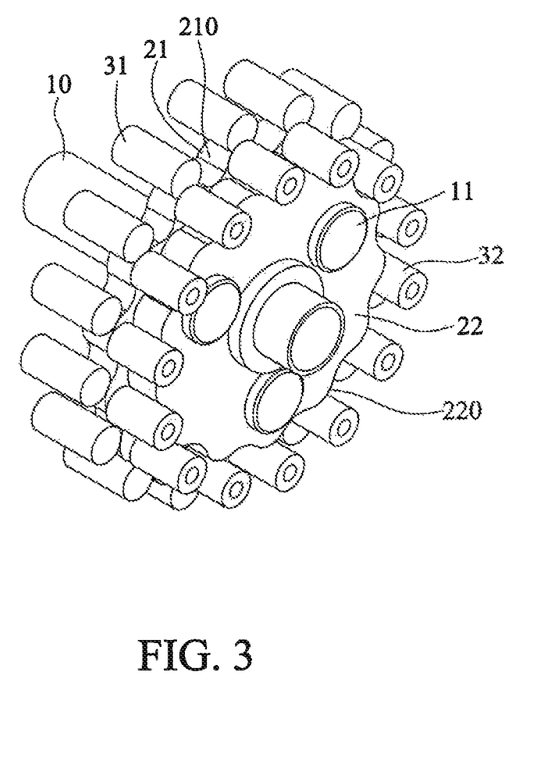
FIG. 3 is a perspective diagram depicting the two-stage differential cycloidal speed reducer with a high reduction ratio of an embodiment in accordance with the present disclosure.

It should be noted that the structures, proportions and sizes shown in the attached drawings are made to accompany the contents of the specification to facilitate understanding and readability of the present disclosure; the present disclosure is not limited as such. Modifications on the structures, changes in relative proportions, and adjustments in sizes are considered to be within the scope of the technical contents disclosed by the present disclosure as long as they do not affect the effects and objectives achieved by the present disclosure. Meanwhile, terms such as 'first, and 'second' cited in the specification are provided for ease of understanding; the present disclosure is not limited as such. Changes or adjustments to relative relationships without substantially changing the technical contents should fall within the scope of the present disclosure Referring to FIGS. 1, 2A, 2B and 3, FIG. 1 is a cross-sectional diagram depicting a two-stage differential cycloidal speed reducer with a high reduction ratio in accordance with the present disclosure, FIGS. 2A and 2B illustrate the main components of the two-stage differential cycloidal speed reducer with a high reduction ratio of an embodiment and another embodiment in accordance with the present disclosure, and FIG. 3 is a partial perspective view of the two-stage differential cycloidal speed reducer with a high reduction ratio in accordance with the present disclosure.

The two-stage differential cycloidal speed reducer with a high reduction ratio in accordance with the present disclosure includes an input shaft 10, supporting crank shafts 11, a first cycloidal gear 21, a second cycloidal gear 22, first ring pins 31, a first annular gear 1, second ring pins 32 and a second annular gear 30. FIG. 1 shows that an outer diameter of the first annular gear 1 is larger than an outer diameter of the second annular sear 30, and the outer diameter of the second annular gear 30 is larger than a diameter of a circle that surrounds the first ring pins 31.

The input shaft 10 has a crank shaft design, including a first crank shaft portion 10a and a second crank shaft portion 10b. The first crank shaft portion 10a and the second crank shaft portion 10b are bent in opposite direction away from axis of the input shaft 10 as the center. In other words, the axis of the first crank shaft portion 10a and the axis of the second crank shaft port on 10b are offset from the axis of the input shaft 10 by 180 degrees.

The plurality of supporting crank shafts 11 is disposed symmetrically with respect to the input shaft 10, i.e., disposed symmetrically around the axis of the input shaft 10 as the center. In an embodiment, there is no limit as to the number of supporting crank shafts 11 and the bending angle of the supporting crank shafts 11.

The first cycloidal gear 21 is disposed on the first crank shaft portion 10a of the input shaft 10 via a bearing 4a. The periphery of the first cycloidal gear 21 has a plurality of teeth 210.

The first annular gear 1 is provided on one end of the input shaft 10 adjacent the first cycloidal gear 21 and has a plurality of first ring pins 31. The plurality of first ring pins 31 is disposed around the outer circumference of the first cycloidal gear 1 and is in sliding contact with the teeth 210 of the first cycloidal gear 21. In an embodiment shown in FIG. 2A, the first annular gear 1 is a fixed member. In another embodiment shown in FIG. 2B, the first annular gear 1 is a rotation member (as output).

The second cycloidal gear 22 is disposed on the second crank shaft portion 10b of the input shaft 10, and connected with the first cycloidal gear 21 through the plurality of supporting crank shafts 11. The periphery of the second cycloidal gear 22 has a plurality of teeth 220. It should be noted that the first cycloidal gear 21 and the second cycloidal gear 22 are parallel to each other. Furthermore, in an embodiment, the mass of the first cycloidal gear 21 and that of the second cycloidal gear 22 are the same in order to improve the dynamic balance of the two-stage differential cycloidal speed reducer with high reduction ratio.

The second annular gear 30 is provided on one end of the input shaft 10 adjacent the second cycloidal gear 22 and has the plurality of second ring pins 32. The plurality of second ring pins 32 is disposed around the outer circumference of the second cycloidal gear 22, and is in sliding contact with the plurality of teeth 220 of the second cycloidal gear 22. In an embodiment shown in FIG. 2A, the second annular gear 30 is a rotation member (as output). In another embodiment shown in FIG. 2B, the second annular gear 30 is a fixed member.

An embodiment shown in FIG. 2A, wherein the first annular gear 1 is fixed, is described in the following. First, a driving source is provided to the input shaft 10 and the first annular gear 1 is fixed. The input shaft 10 drives the first cycloidal gear 21 and the second cycloidal gear 22 to orbit (revolve) around the input shaft 10. Then, the first cycloidal gear 21 self rotates around the axis of the first crank shaft portion 10a under the constraint of the first ring pins 31, such that the first cycloidal gear 21 drives the second cycloidal gear 22 into rotation via the plurality of supporting crank shafts 11. As a result, the second cycloidal gear 22 rotates around the axis of the second crank shaft portion 10b and revolves around the axis of the input shaft 10. The second cycloidal gear 22 then drives the second annular gear 30 into rotation through the second ring pins 32. The input shaft 10 and the second annular gear 30 rotate in the same direction. Besides, in an embodiment shown in FIG. 2B, when the second annular gear 30 is fixed, the input shaft 10 and the first annular gear 1 rotate in opposite directions.

Figure 4A:
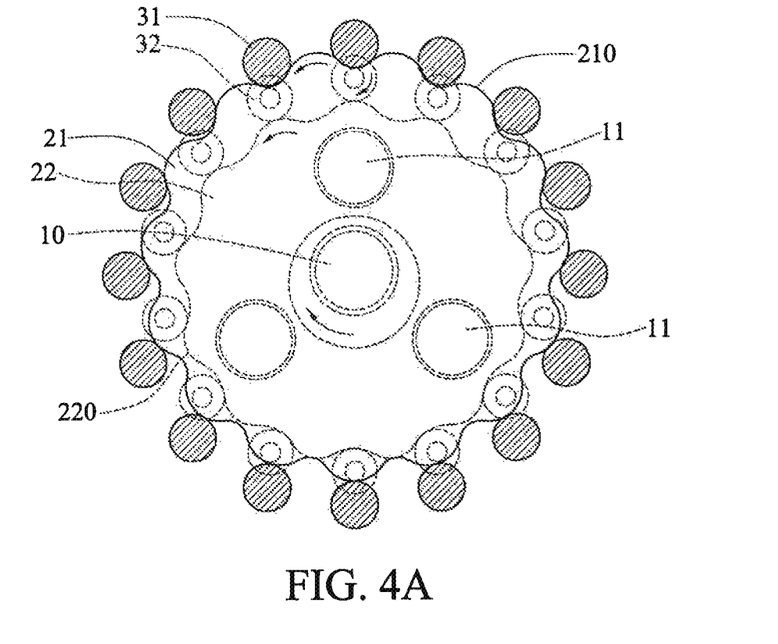
FIGS. 4A and 4B are rear and front views illustrating the direction of rotation of the two-stage differential cycloidal speed reducer with a high reduction ratio of FIG. 3.
Figure 4B:
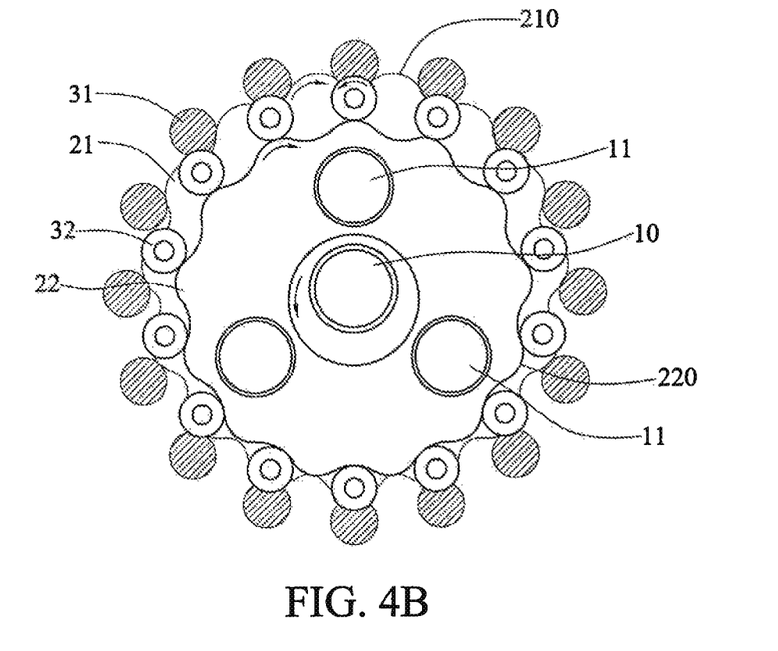

The motions of the first cycloidal gear 21 and the second cycloidal gear 22 are described in details with reference to FIGS. 4A and 4B, wherein the first annular gear 1 is fixed. It should be noted that only the first cycloidal gear 21, the second cycloidal gear 22, the first ring pins 31, and the second ring pins 32 are shown in FIGS. 4A and 4B, and the first annular gear 1 and the second annular gear 30 are omitted. The first ring pins 31 on the first annular gear 1 are fixed with no rotation. The direction of rotation of the second ring pins 32 on the second annular gear 30 is the same with that of the second annular gear 30. The movement of the second annular gear 30 is described below.

As shown in FIGS. 4A and 4B, the number of first ring pins 31 is larger than the number of second ring pins 32; the number of first ring pins 31 is larger than the teeth number of the first cycloidal gear 21; the number of second ring pins 32 is larger than the teeth number of the second cycloidal gear 22; and the teeth number of the first cycloidal gear 21 is larger than that of the second cycloidal gear 22. For example, in FIGS. 4A and 4B, the number Zp1 of first ring pins 31 is 16; the teeth number Zc1 of the first cycloidal gear 21 is 15; the teeth number Zc2 of the second cycloidal gear 22 is 13; the number Zp2 of second ring pins 32 is 14, the first annular gear 1 is fixed, and the reduction ratio of the speed reducer is $$\frac{Zc1 \times Zc2}{Zc1 - Zc2} \times \frac{Zp2}{Zc2} = 105$$

is with the first annular gear 1 fixed. Therefore, the input shaft 10 and the second annular gear 30 rotate in the same direction. It should be note that the number of the first ring pins 31, the number of the second ring pins 32, the teeth number of the first cycloidal gear 21, and the teeth number of the second cycloidal gear 22 in FIGS. 4A and 4B are for illustrative purpose only and not used to limit the scope of the present disclosure in any way. Besides, when the second annular gear 30 is fixed, the reduction ratio is $$\frac{Zc1 \times Zc2}{Zc2 - Zc1} \times \frac{Zp1}{Zc1} = -104.$$

Therefore, the input shaft 10 and the first annular gear 1 rotate in the opposite directions.

Moreover, FIG. 4A is a rear view depicting the direction of rotation of the two-stage differential cycloidal speed reducer with a high reduction ratio of FIG. 3, wherein the first annular gear 1 is fixed. As shown in FIG. 4A, the input shaft 10 rotates clockwise (e.g., as indicated by the arrow), which drives the first cycloidal gear 21 on the first crank shaft portion 10a into motion, so that the first cycloidal gear 21 revolves around the axis of the input shaft 10, and self rotates around the axis of the first crank shaft portion 10a under the constraints of the first ring pins 31 (e.g., as indicated by the arrow). The direction of revolution of the first cycloidal gear 21 is clockwise just like that of the input shaft 10, and the direction of self rotation of the first cycloidal gear 21 is anticlockwise. Then, the first cycloidal gear 21 drives the second cycloidal gear 22 into motion through the plurality of supporting crank shafts 11, so that the second cycloidal gear 22 self rotates around the axis of the second crank shaft portion 10b (e.g., as indicated by the arrow) and revolves around the axis of the input shaft 10, wherein the direction of revolution of the second cycloidal gear 22 is clockwise just like that of the input shaft 10, and the direction of self rotation of the second cycloidal gear 22 is anticlockwise. Finally, the second cycloidal gear 22 drives the second annular gear 30 into motion through the second ring pins 32. Since the direction of rotation of the second ring pins 32 is clockwise (as indicated by the arrow), the direction of the second annular gear 30 is also clockwise like that of the input shaft 10.

Furthermore, FIG. 4B is a front view depicting the direction of rotation of the two-stage differential cycloidal speed reducer with a high reduction ratio of FIG. 3, wherein the first annular gear 1 is fixed. The first cycloidal gear 21 self rotates with respect to the axis of the first crank shaft portion 10a and revolves around the axis of the input shaft 10. The second cycloidal gear 22 self rotates with respect to the axis of the second crank shaft portion 10b and revolves around the axis of the input shaft 10. It should be noted that in FIG. 4B, the arrows on the first cycloidal gear 21 and the second cycloidal gear 22 indicate the direction of self rotation.

The direction of self rotation of the first cycloidal gear 21 is the same as the direction of self rotation of the second cycloidal gear 22. The direction of revolution of the first cycloidal gear 21 is the same as the direction of revolution of the second cycloidal gear 22. The direction of self rotation of the first cycloidal gear 21 is opposite to the direction of rotation of the input shaft 10 and the second annular gear 30, and the direction of revolution of the first cycloidal gear 21 is the same as the direction of rotation of the input shaft 10 and the second annular gear 30; similarly, the direction of self rotation of the second cycloidal gear 22 is opposite to the direction of rotation of the input Shaft 10 and the second annular gear 30, and the direction of revolution of the second cycloidal gear 22 is the same as the direction of rotation of the input shaft 10 and the second annular gear 30.

In summary, the input shaft in the two-stage differential cycloidal speed reducer with a high reduction ratio in accordance with the present disclosure employs a crank shaft design, as well as the symmetrically arranged supporting crank shafts for connecting the first cycloidal gear and the second cycloidal gear parallel to each other, thereby actuating the first cycloidal gear and the second cycloidal gear simultaneously.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A two-stage differential cycloidal speed reducer with a high reduction ratio, comprising:
    an input shaft including a first crank shaft portion and a second crank shaft portion, the first crank shaft portion and the second crank shaft portion bending in opposite directions, with an axis of the input shaft as a center;
    a first cycloidal gear provided on the first crank shaft portion of the input shaft and having a plurality of teeth on the periphery thereof;
    a first annular gear provided on one end of the input shaft adjacent the first cycloidal gear and having a plurality of first ring pins provided around an outer circumference of the first cycloidal gear and being in sliding contact with the plurality of teeth of the first cycloidal gear;
    a plurality of supporting crank shafts;
    a second cycloidal gear provided on the second crank shaft portion of the input shaft and connected with the first cycloidal gear through the plurality of supporting crank shafts, and having a plurality of teeth on a periphery thereof; and
    a second annular gear provided on one end of the input shaft adjacent the second cycloidal gear and having a plurality of second ring pins provided around an outer circumference of the second cycloidal gear and in sliding contact with the plurality of teeth of the second cycloidal gear,
    wherein the first cycloidal gear drives the second cycloidal gear through the plurality of supporting crank shafts, and the first cycloidal gear has a teeth number greater than a teeth number of the second cycloidal gear, and
    wherein an outer diameter of the first annular gear is larger than an outer diameter of the second annular gear, and the outer diameter of the second annular gear is larger than a diameter of a circle that surrounds the first ring pins.

2. The two-stage differential cycloidal speed reducer of claim 1, wherein when the first annular gear is fixed, the input shaft drives the first and second cycloidal gears to rotate around an axis of the input shaft, the first cycloidal gear is constrained by the first ring pins and counter rotates an axis of the first crank shaft portion of the input shaft, the first cycloidal gear drives, via the supporting crank shafts, the second cycloidal gear to rotate around an axis of the second crank shaft portion of the input shaft, and the second cycloidal gear drives, via the second ring pins, the second annular gear to rotate.

3. The two-stage differential cycloidal speed reducer of claim 1, wherein when the first annular gear is fixed, the input shaft and the second annular gear rotate in the same direction.

4. The two-stage differential cycloidal speed reducer of claim 1, wherein when the second annular gear is fixed, the input shaft and the first annular gear rotate in opposite directions.

5. The two-stage differential cycloidal speed reducer of claim 1, wherein the first cycloidal gear and the second cycloidal gear are parallel to each other.

6. The two-stage differential cycloidal speed reducer of claim 1, wherein the mass of the first cycloidal gear is equal to the mass of the second cycloidal gear.

7. The two-stage differential cycloidal speed reducer of claim 1, wherein the plurality of supporting crank shafts is disposed symmetrically about the input shaft.

8. The two-stage differential cycloidal speed reducer of claim 1, wherein the number of the first ring pins is larger than the number of the second ring pins.

9. The two-stage differential cycloidal speed reducer of claim 1, wherein the number of the first ring pins is larger than the teeth number of the first cycloidal gear.

10. The two-stage differential cycloidal speed reducer of claim 1, wherein the number of the second ring pins is larger than the teeth number of the second cycloidal gear.

11. The two-stage differential cycloidal speed reducer of claim 1, wherein the first cycloidal gear rotates around the axis of the first crank shaft portion of the input shaft and revolves around the axis of the input shaft, and the second cycloidal gear rotates around the axis of the second crank shaft portion of the input shaft and revolves around the axis of the input shaft.

12. The two-stage differential cycloidal speed reducer of claim 11, wherein the first cycloidal gear and the second cycloidal gear rotate about their own axis in the same direction.

13. The two-stage differential cycloidal speed reducer of claim 11, wherein the first and second cycloidal gears rotate around the input shaft in a same direction as a direction in which the input shaft rotates.

14. The two-stage differential cycloidal speed reducer of claim 1, wherein the second annular ring has an indented space in which the first cycloidal gear and the first ring pins are accommodated, and the first annular ring has an indented space in which the second annular ring is accommodated.

* * * * *